United States Patent
Tuzel et al.

(10) Patent No.: US 8,405,531 B2
(45) Date of Patent: Mar. 26, 2013

(54) METHOD FOR DETERMINING COMPRESSED STATE SEQUENCES

(75) Inventors: Cuneyt Oncel Tuzel, Cambridge, MA (US); Gungor Polatkan, Piscataway, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 116 days.

(21) Appl. No.: 12/872,054

(22) Filed: Aug. 31, 2010

(65) Prior Publication Data

US 2012/0053944 A1 Mar. 1, 2012

(51) Int. Cl.
*H03M 7/00* (2006.01)
*H03M 7/46* (2006.01)

(52) U.S. Cl. ............... 341/59; 341/50; 341/63
(58) Field of Classification Search ........... 341/50–63
See application file for complete search history.

(56) References Cited

U.S. PATENT DOCUMENTS

| | | | |
|---|---|---|---|
| 4,593,367 A * | 6/1986 | Slack et al. | 706/12 |
| 6,366,418 B1 * | 4/2002 | McEwen et al. | 360/48 |
| 7,348,899 B2 * | 3/2008 | Kravtsounov et al. | 341/51 |

OTHER PUBLICATIONS

Fern et al. "Relational sequential inference with reliable observations", in ICML, 2004.*
Fern, "A Simple-Transition Model for Relational Sequences", in IJCAI-05, pp. 696-701, 2005.*

\* cited by examiner

*Primary Examiner* — Samuel G Neway
(74) *Attorney, Agent, or Firm* — Dirk Brinkman; Gene Vinokur (57) ABSTRACT

A compressed state sequence s is determined directly from the input sequence of data x. A deterministic function $f(x)$ only tracks unique state transitions, and not the dwell times in each state. A polynomial time compressed state sequence inference method outperforms conventional compressed state sequence inference techniques.

10 Claims, 9 Drawing Sheets

METHOD FOR DETERMINING COMPRESSED STATE SEQUENCES

FIELD OF THE INVENTION

This invention relates generally to a method for determining a state sequences from an input sequence of data, and more particularly to determining a compressed state sequence.

BACKGROUND OF THE INVENTION

Assigning labels to sequential data is a common problem in applications such as speech recognition, computational linguistic, computer vision, and robotics. For example, analyzing parts of speech, the task is to tag a sequence of words by considering the grammatical structure of the language, e.g., verb-verb-noun-noun-verb-adjective is a very unlikely grammatical sequence in English, while noun-verb-adverb is not. Similarly, in speech recognition, words or phonemes obey certain pronunciation rules of the underlying language, particularly as to their sequential order.

Likewise, one can assign letters and numbers to a sequence of hand-written characters by exploiting the structure enforced by the grammar of the underlying language. In these examples, sequential patterns are important and can be exploited to extract information from large data sets.

Two common model for solving such problems are hidden Markov models (HMMs), and conditional random fields (CRFs). Although these models are very powerful, different types of data require modifications specific to applications, resulting in various extensions of the models.

For example, a semi-Markovian CRF is a more general solution for a segmentation problem allowing non-Markovian state transitions in segments of data and assigning labels directly to the sequences, instead individual samples.

Another method describes non-parametric prior probabilities for systems with state persistence to prevent unrealistic state transitions. That method provides state persistence, and also allows training the transition probabilities in an infinite state space. In the above examples, the basic task of the final state sequence inference is to estimate a precise state sequence.

However, in many applications, that is not a necessary goal. Instead, the goal is to estimate some deterministic function of the state sequence. Particularly, the goal is to track the state transitions without accounting for the dwell times in each state.

In an example application, the movement of a person is tracked when exact transitions between states such as "sitting (s)," "jumping (j)," "walking (w)," and "running (r)," are ambiguous and not important, but the detection of unique sequence of states that occurred in a specified order is important.

For example, a ground truth example state sequence of human movement is y={s, s, j, j, j, w, w, r, r}, and an input sequence of data is x={$x_1$, $x_2$, . . . , $x_9$}. The goal is to accurately predict the output of a deterministic function compress, where compress(y)={s, j, w, r}. That is, duplicate states are removed in the compressed sequence.

Moreover, when a predicted state sequence y'={s, s, j, j, j, w, r, r} is acquired by converting the first occurrence of the state 'w' to 'j' exactly at the transition from j to w, it is an error for conventional applications, but it is not an error for in an application with compressed state sequence inference, because compress(y)=compress(y').

Inversely, when a predicted sequence is y"={s, s, j, j, w, j, w, r, r}, it is a fatal error for this application, even though it is only one state different from y. Here, state transition ambiguity is not the only feature of the problem, but the length of the compressed output is unknown and arbitrary, e.g., it is unclear how many unique actions occurred in the order of appearance during the movement of human.

There are several other problems that require such a special treatment in state sequence inference, including state counting processes in which one is interested in counting unique states in a sequence without considering the dwell times. To the best of our knowledge, this is a problem largely unaddressed in machine learning applications.

Compressed sequences have been described for a video-interpretation application. Exact state transitions are ambiguous and only distinct states are important for the video-interpretation. That method is only applicable to a very limited domain and probabilistic models can not be used due to a very high number of states.

In another video interpretation application, a simple transition-cost model is, used, wherein a state transition to the same state is assumed to have no cost, whereas all other possible transitions are assumed to have the same cost K. This is very similar to train a probabilistic sequential model that has zero weight for all transition to the same state, and same cost K as the weight for all other transitions, which is completely unrealistic in many applications, because sequential modeling of state transitions is destroyed.

Figure 1:
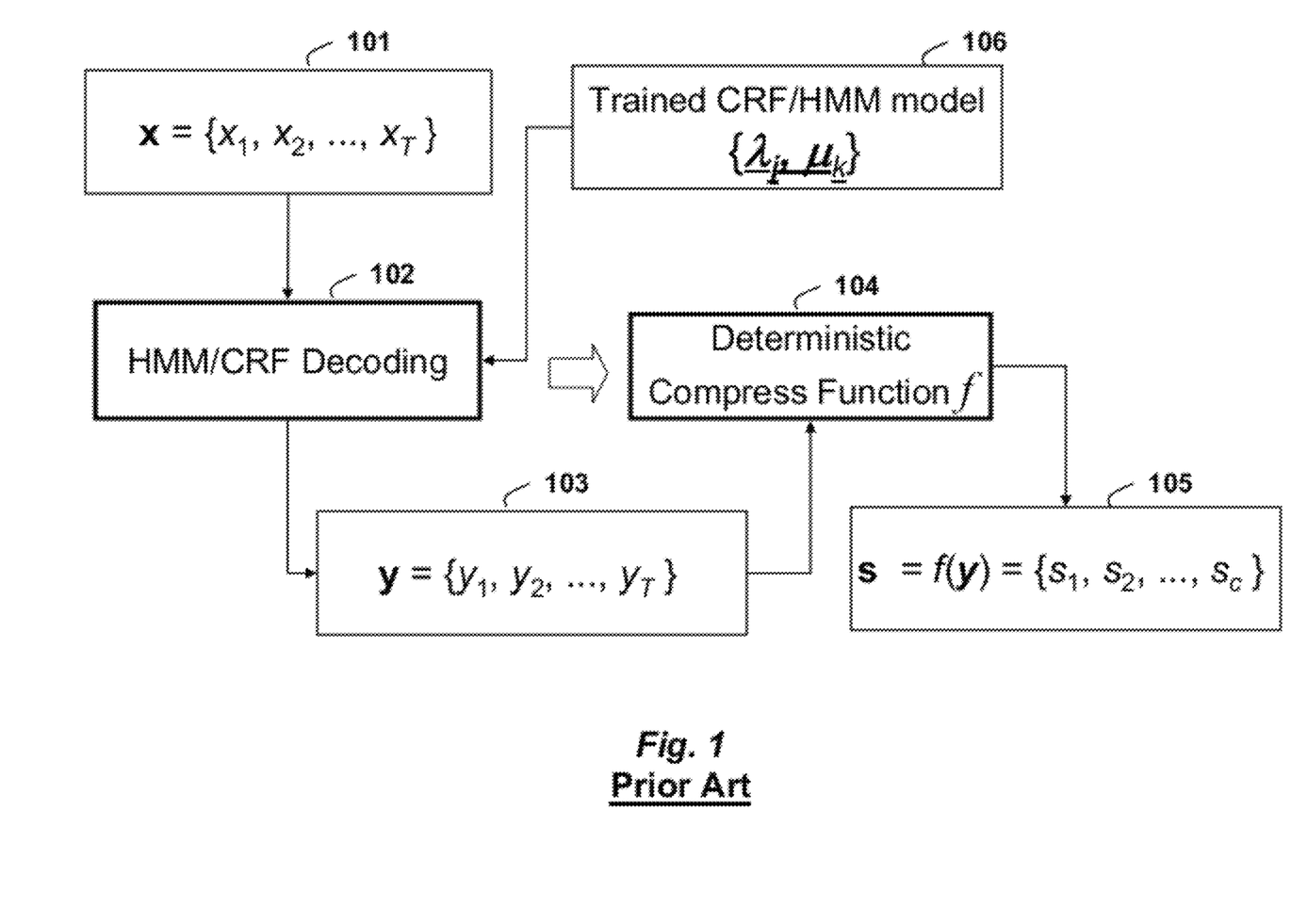
FIG. 1 is a block diagram of conventional HMM/CRF decoding followed by applying a deterministic function ƒ, which produces compressed state sequence.

FIG. 1 shows a conventional compressed state sequence inference method. Given the input sequence of data x={$x_1$, $x_2$, . . . , $x_T$} 101 and previously trained HMM/CRF parameters {$\lambda_j, \mu_k$} 106, a HMM/CRF decoding method 102 predicts a complete state sequence y={$y_1$, $y_2$, . . . , $y_T$} 103 that corresponds to the data 101. Here, the increments of the index T are time steps. Then, a deterministic compress function $f$ 104 is applied to the complete state sequence 103 to determine a compressed sequence of unique states s=$f$(y)={$s_1, s_2, \ldots, s_c$} 105. In the compressed state sequence, all duplicate states in the complete state sequence 103 are removed.

SUMMARY OF THE INVENTION

Hidden Markov models (HMMs) and conditional random fields (CRFs) are two popular techniques for modeling sequential data x. State sequence inference procedures using CRFs and HMMs enable the estimation of a state sequence y, given the input sequence of data x.

However, in many applications, estimation of the precise (complete) state sequence is not a necessary goal. Instead, the goal is to estimate some deterministic function $f$ of the state sequence x to obtain a compressed state sequence y. In such applications, estimating the state sequence by conventional state sequence inference techniques, and then determining the functional mapping from the estimate is not necessarily optimal.

Therefore, the invention determines the compressed state sequence s directly from the input sequence of data x.

In particular, we consider the specific problem where the deterministic function $f$(x) only tracks unique state transitions and not the dwell times in each state.

We provide a polynomial time compressed state sequence inference method that outperforms conventional compressed state sequence inference techniques. The problem we solve commonly arises in many disparate applications, such as robot tracking, character, handwriting and speech recognition.

DETAILED DESCRIPTION OF THE PREFERRED EMBODIMENTS

Figure 2A:
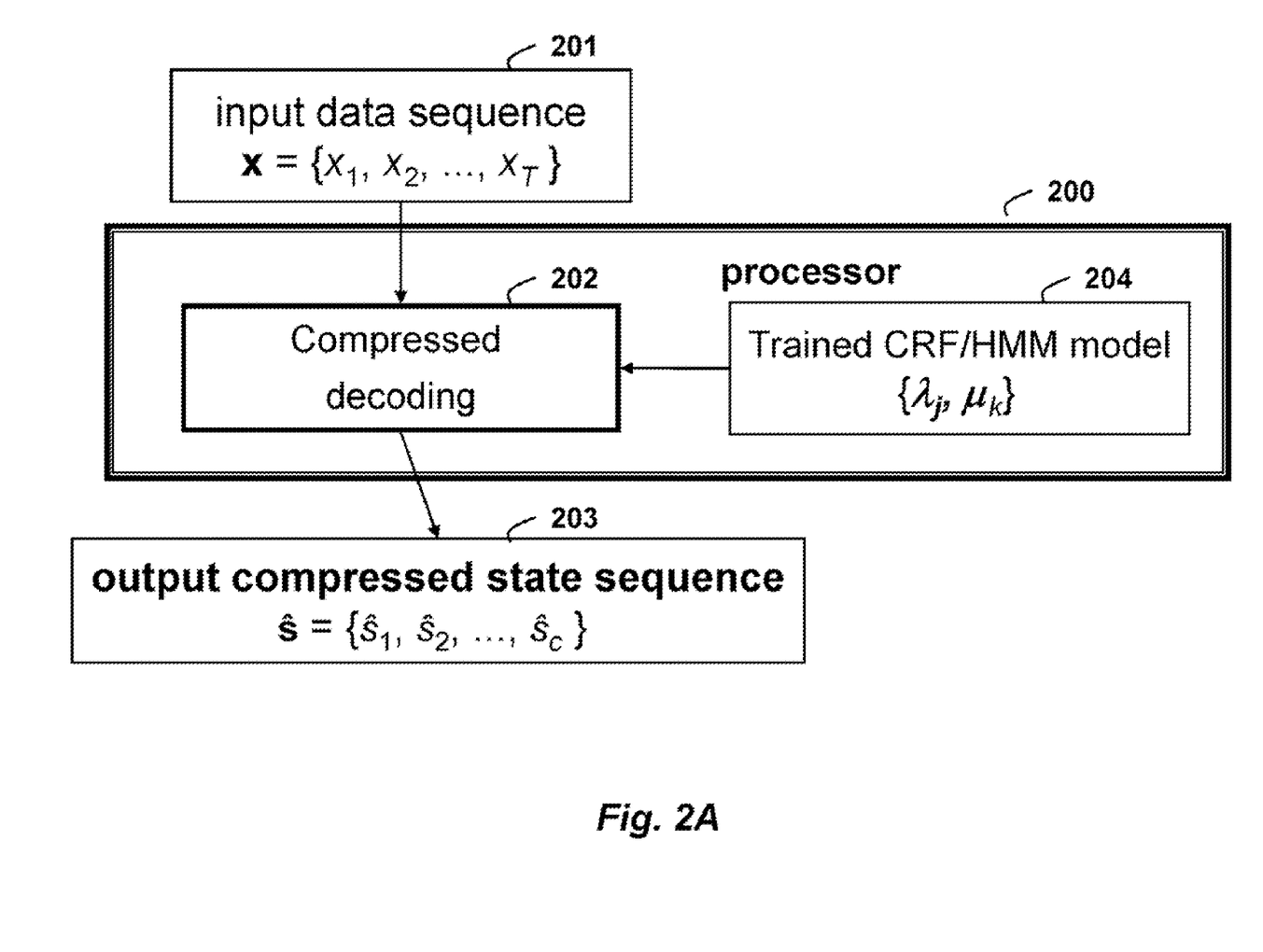
FIGS. 2A-2B are block diagrams of compressed HMM/CRF decoding, which directly outputs the compressed state sequence according to embodiments of the invention.
Figure 2B:
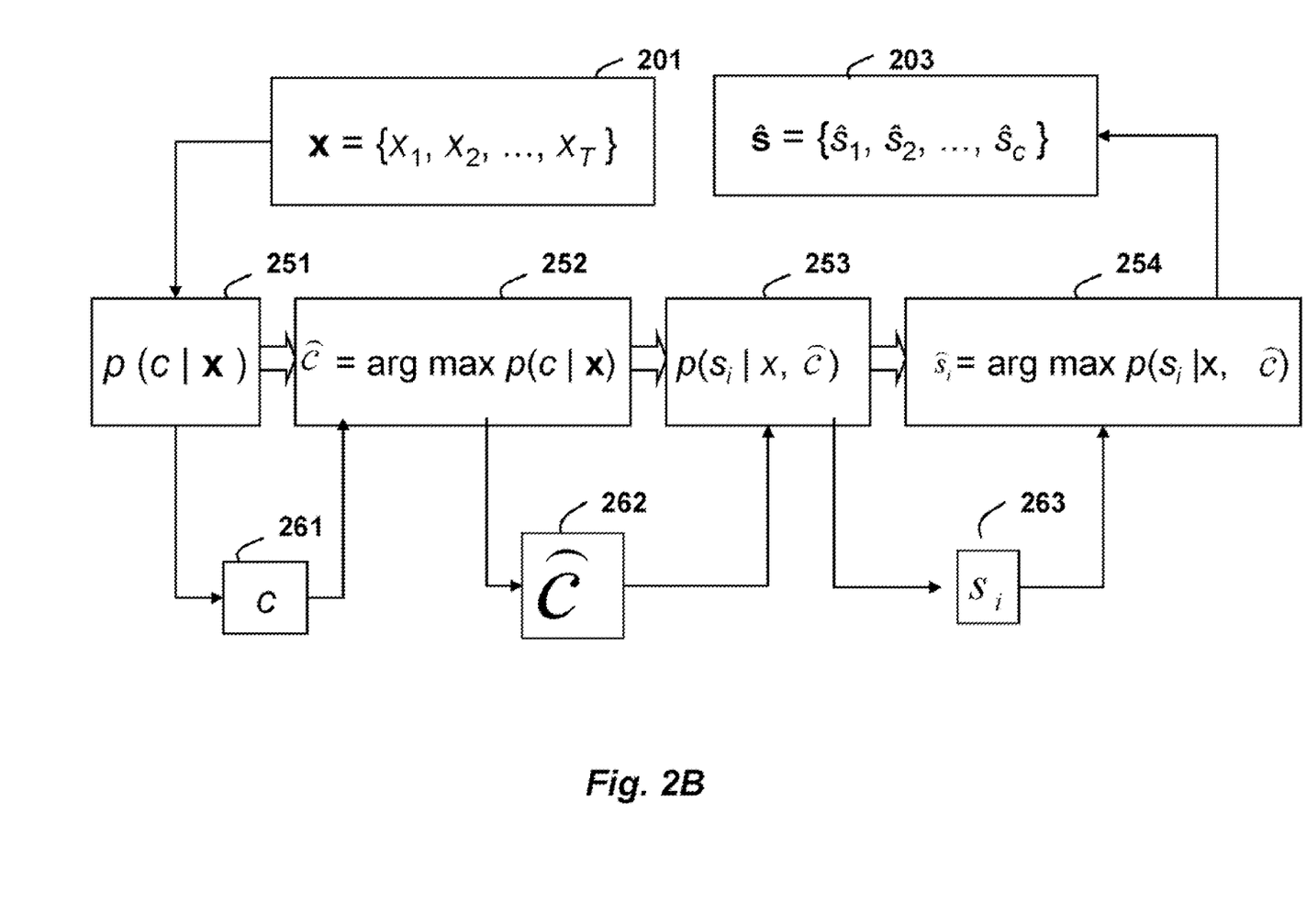

FIGS. 2A and 2B shows a compressed state sequence inference method according to embodiments of our invention. Given the input sequence of data $x=\{x_1, x_2, \ldots, x_T\}$ 201, wherein the data are indexed by T. For example, the sequence is a time series. Using parameters $\{\lambda_j, \mu_k\}$ 204 of a trained HMM or CRF model, a compressed decoding method 202 directly outputs an estimated compressed state sequence $\hat{s}=\{\hat{S}_1, \hat{S}_2, \ldots, \hat{S}_c\}$ 203. The steps of the method can be performed in a processor 200 connected to a memory and input/output interfaces as known in the art.

Conditional Random Fields and State Sequence Inference Techniques

Linear-chain conditional random fields CRFs and hidden Markov models (HMMs) are two probabilistic models that can be used for labeling sequential data. After the data are labeled, state sequences can be determined. Linear-chain CRFs and HMMs can be used interchangeably depending on a the selected feature function. We focus on procedures for CRFs.

However, the procedures are equally applicable to HMMs. It not important for our method which particular model we are use, i.e., results can be generalized from one to the other. Although, we use linear-chain CRFs in this description, the method is also applicable for HMMs.

Conventional Conditional Random Fields

A linear chain CRF for modeling a conditional distribution p(x|y) can be defined as $$p(y|x) = \frac{1}{Z(x)} = \prod_{t=1}^{T} \Psi(y_t, y_{t-1}, x_t), \quad (1)$$

$$\Psi(y_t, y_{t-1}, x_t) = \exp\left\{\sum_j \lambda_j g_j(y_{t-1}, y_t, x) + \sum_k \mu_k u_k(y_t, x)\right\}, \quad (2)$$

where $\Psi$ is a potential function, g is a transition feature function from one state to a next state, u is a feature function, $\lambda$ and $\mu$ are parameters estimated by a training process, and Z is a normalization factor, which is a function of the input data sequence.

Conventional State Sequence Inference Techniques

A conventional labeling a data sequence uses a joint density $y^*=\arg\max_y p(y|x)$, wherein the function "arg max" returns a maximum. The solution can be determined via a Viterbi procedure using a recursion $\delta_t(j)=\max_i \Psi(j, i, x_t)\delta_{t-1}$, which propagates the most likely path based on a maximal product rule. However, in many applications, accurately predicting the complete sequence is very difficult so that individual predictions are used. This can be achieved via predicting $y_{i,t}$ from a marginal distribution $p(y_{i,t}|x)$ by applying a dynamic programming procedure called Forward-Backward. The forward recursion is $\alpha_t(j)=\Sigma_i \Psi(j, i, x_t)\alpha_{t-1}(i)$, where $\alpha_t(j)$ are the forward variables, and the backward recursion is $\beta_t(i) = \Sigma_j \Psi_{t+1}(j, i, x_{t+1})\beta_{t+1}(j)$, where $\beta_t(i)$ are the backward variables. Then, the marginal probabilities can be determined by using these variables.

A constrained forward procedure can be used to determine a confidence in a particular state sequence by constraining the forward recursion to the constrained state sequence. Given a set of constraints $Y'=\{y_q, \ldots, y_r\}$, a modified forward procedure is used to determine the probability of any data sequence satisfying Y'.

The modified forward recursion is $$\hat{\alpha}_t(j) = \begin{cases} \sum_i \Psi(j, i, x_t)\hat{\alpha}_{t-1}(i) & \text{for } j \simeq y_{t+1} \\ 0 & \text{otherwise} \end{cases} \quad (3)$$

for all $y_{t+1}$ 2 Y', where the operator $j \simeq y_{t+1}$ is defined as "j conforms to the constraint $y_{t+1}$". At index T, the confidence of a specific constraint is Z'/Z, where the constrained lattice factor $Z'=\Sigma_i \hat{\alpha}_T(i)$ and the unconstrained lattice factor $Z=\Sigma_i \alpha_T(i)$ are determined using the constrained forward variables, and unconstrained forward variables, respectively. Similarly, the same method is followed while estimating a marginal distribution $p(y_{i,t}|x)$ by having a single constraint $y_{i,t}$ in the set Y'.

Compressed State Sequence Inference

The embodiments of the invention provide a method for inferring a compressed sequence of states from acquired data. In one example application for predicting human motion, we define the compressed sequence of states as s=compress(y), where s, j, w, r are arbitrary states. If y={s, s, j, j, j, w, w, r, r}, then s=compress(y)={s, j, w, r}. Hereinafter, we use the symbol 𝒞 to represent the function compress. Our goal is to predict the compressed sequence s as accurately as possible. We construct a framework for determining the probability p(s|x).

The probability of the compressed state sequence $s_0$ is given by a marginalization over all segmentations y where the probability of compressed representation $s_0$ is:

$$p(s=s_0|x) = \sum_{\forall y: \mathscr{C}(y)=s_0} p(y|x), \quad (4)$$

the symbol 𝒞 represents a compress function.

Although determining the probability of p(y|x) is efficient, the summation in Equation (4) includes an exponential number of operations $M^T$, where M is the number of states and T is the length of the complete state sequence y, which is intractable. Therefore, we provide a polynomial time procedure for determining $p(s=s_0|x)$ using dynamic programming forward-backward procedure.

We now describe the basic steps of our compressed state sequence inference method.

Determining the Probability $p(s=s_0|x)$

In Equation (4) there can be an exponential number of possible complete state sequences y corresponding to the compressed sequence $s_0$. To overcome this problem, we describe tracking transitions in the sequence s while applying the forward recursion.

Figure 3A:
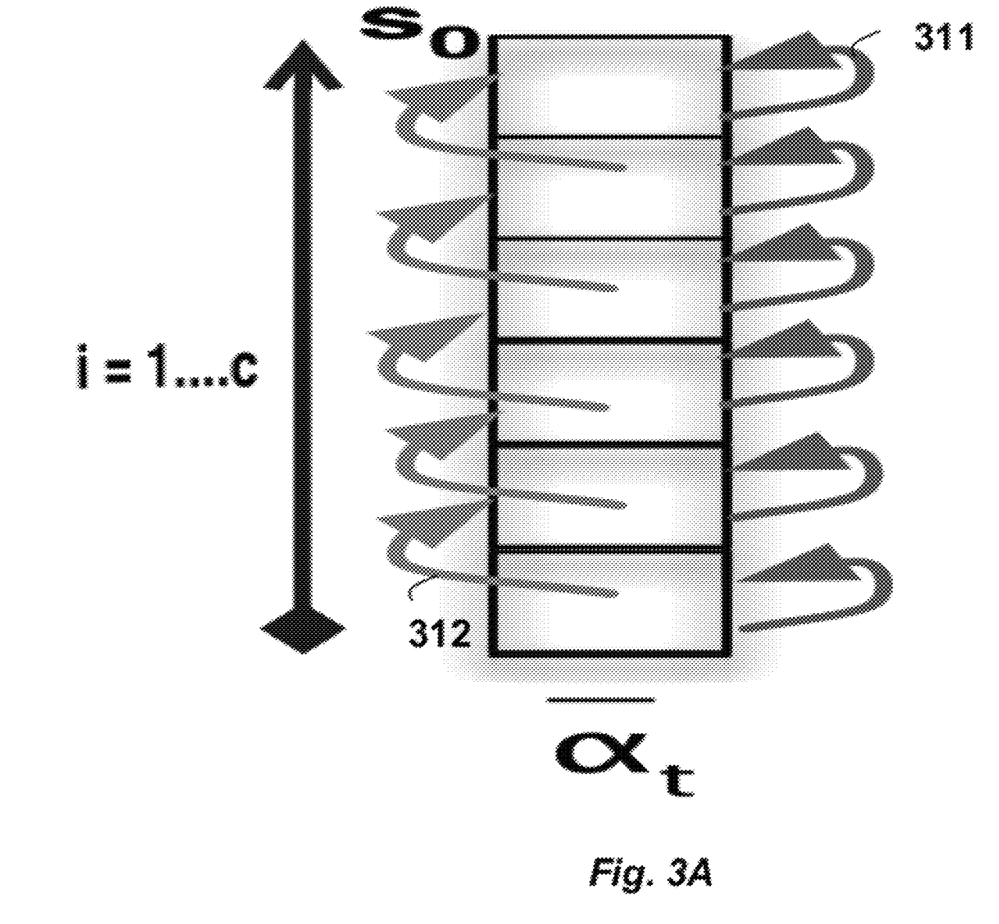
FIGS. 3A-3C are schematics of the compressed state sequence inference method according to embodiments of the invention.

As shown in FIG. 3A, a length of the sequence $s_0$ is $c=|s_0|$. For ease of notation, we refer to individual terms of $s_0$ as $s_i$, $i=1, \ldots, c$. We define a forward variables $\bar{\alpha}_t(i)$, which tracks exactly $i-1$ transitions in the sequence $s_0$ up to t. From the index $t-1$ to index t, the forward variables are updated based on:

staying in the same state for the input data $x_t$ which is shown with the arrows 311; and making a transition from state $s_i$ to $S_i+1$, which is shown with the arrows 312.

The dynamic programming method is as follows.

The probability $p(s=s_0|x)$ of the sequence $s_0$, is $$p(s = s_0 | x) = \sum_{\forall y: \mathscr{S}(y)=s_0} p(y|x) \propto \sum_{\forall y: \mathscr{S}(y)=s_0} \prod_{t=1}^T \Psi(y_t, y_{t-1}, x_t),$$

which is determined by the recursion:

$$\bar{\alpha}_t(i) = \Psi(s_i, s_{i-1}, x_t)\bar{\alpha}_{t-1}(i-1) + \Psi(s_i, s_i, x_t)\bar{\alpha}_{t-1}(i),$$

where $i=1, \ldots, c$.

At index (time) T, we obtain $$\bar{\alpha}_T(c) = \sum_{\forall y: \mathscr{S}(y)=s_0} \prod_{t=1}^T \Psi(y_t, y_{t-1}, x_t).$$

By this recursion, we determine the lattice normalization factor $Z(s_0)=\bar{\alpha}_T(c)$. The normalization factor Z converts $Z(s_0)$ to a probability by $p(s=s_0|x)=Z(s_0)/Z$. The computation of normalization factor Z is described below. The proof of this method is given in the Appendix.

Determining $p(c=c_0|x)$.

Given the input sequence of data x, the first step of determining the compressed sequence s is to determine the length c of the sequence s, where c can take values from 1, which means there is no state transition, up to the sequence length T, which means there is a transition at every single increment. For all $c>T$, $p(c=c_0|x)$ is zero. The set of compressed state sequences of length i is $S_i$, i.e., $S_i=\{s:|s|=i\}$, for $i=1, \ldots, T$. If $S_i \cap S_j = \emptyset$, for $i \neq j$, then the probability $p(c=c_0|x)$ is $$p(c = c_0 | x) = p(s \in \mathbb{S}_{c_0} | x) = \qquad (5)$$

$$\sum_{\forall s': |s'|=c_0} p(s = s'|x) \propto \sum_{\forall s': |s'|=c_0} \sum_{\forall y: \mathscr{S}(y)=s'} \prod_{t=1}^T \Psi(y_t, y_{t-1}, x_t).$$

Figure 3B:
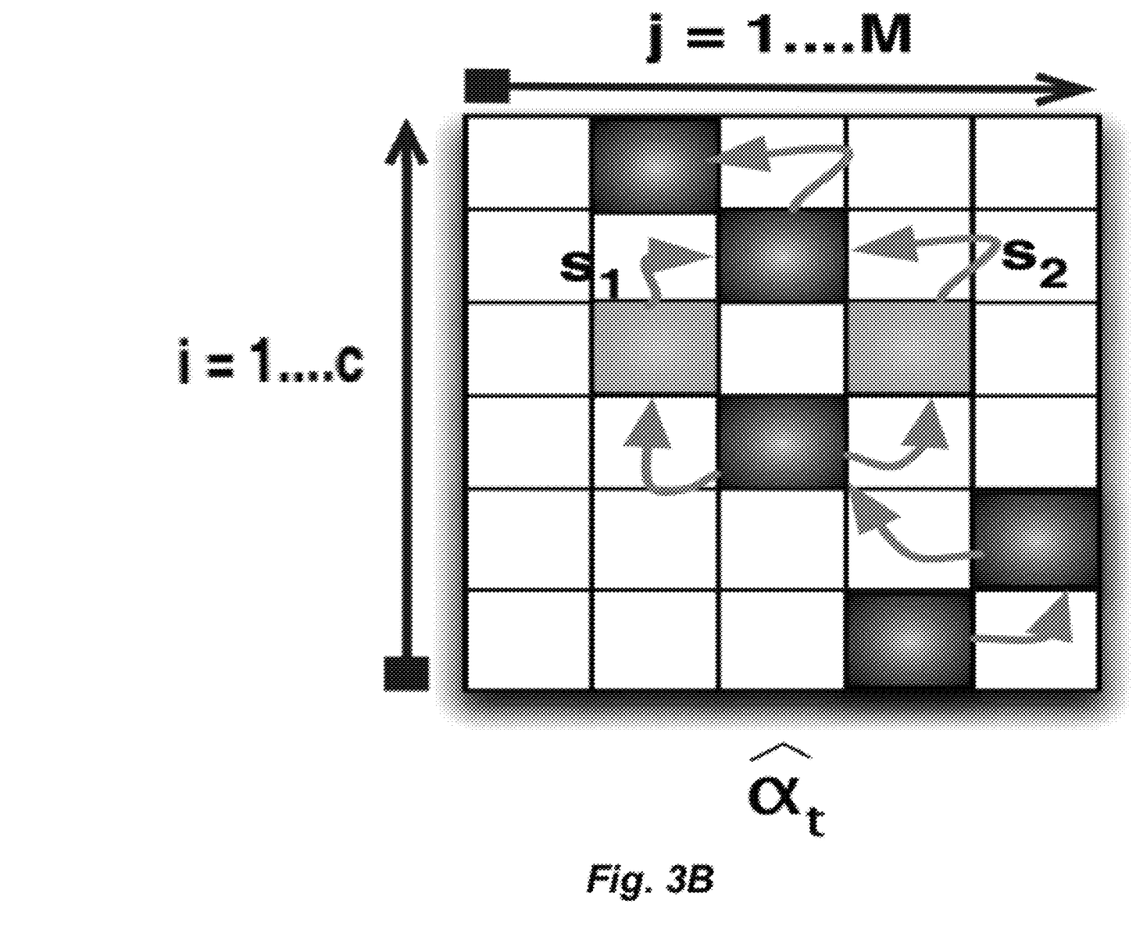

The probability of one possible sequence $s_0$ of length c is $p(s=s_0|x)$. If we have two possible compressed sequences $s_1$ and $s_2$, as shown in FIG. 3B, then $p(s=s_1|x)=p(s=s_2|x) \propto \bar{\alpha}_T(c)_{s_1} + \bar{\alpha}_T(c)_{s_2}$, where $\bar{\alpha}_T(c)_{s_i}$ means that the forward recursion was applied for the sequence $s_i$. However, these two sequences are different at only one point in the compressed domain. To be able to represent the sequences by the same lattice and avoid multiple calculations, we represent the vector representation of $\bar{\alpha}_t$ in a table. The forward variable $\alpha_t$ is M dimensional, and the previous $\bar{\alpha}_t$ is c dimensional. Our $\hat{\alpha}_t$ is c×M dimensional.

The set of all constraints on the lattice is $Q=\{\ldots, q_{l-1}, q_l, q_{l+1}, \ldots\}$, where each constraint $q_l$ is a tuple of the coordinates of the nonzero entries of the table. For example, for a particular compressed sequence $s_0$, the set corresponds to $\{(1, s_1), (2, s_2), \ldots, (c, s_c)\}$. For a particular set $S_i$, the set corresponds to all coordinates of the table with height I, which is denoted by $Q_{\mathbb{S}_i}$. The recursion for a given constraint set Q is as follows:

$$\hat{\alpha}_t(i, j)_Q = \qquad (6)$$

$$\begin{cases} \Psi(j, j, x_t)\hat{\alpha}_{t-1}(i, j)_Q + \sum_{\forall k: k \neq j} \Psi(j, k, x_t)\hat{\alpha}_{t-1}(i-1, k)_Q & \text{if } (i, j) \in Q \\ 0 & \text{otherwise.} \end{cases}$$

As shown in FIG. 3B, this recursion propagates through all non-zero entries in the table, and ignores all zero entries, because the zero entries are not included in the lattice Q.

Figure 3C:
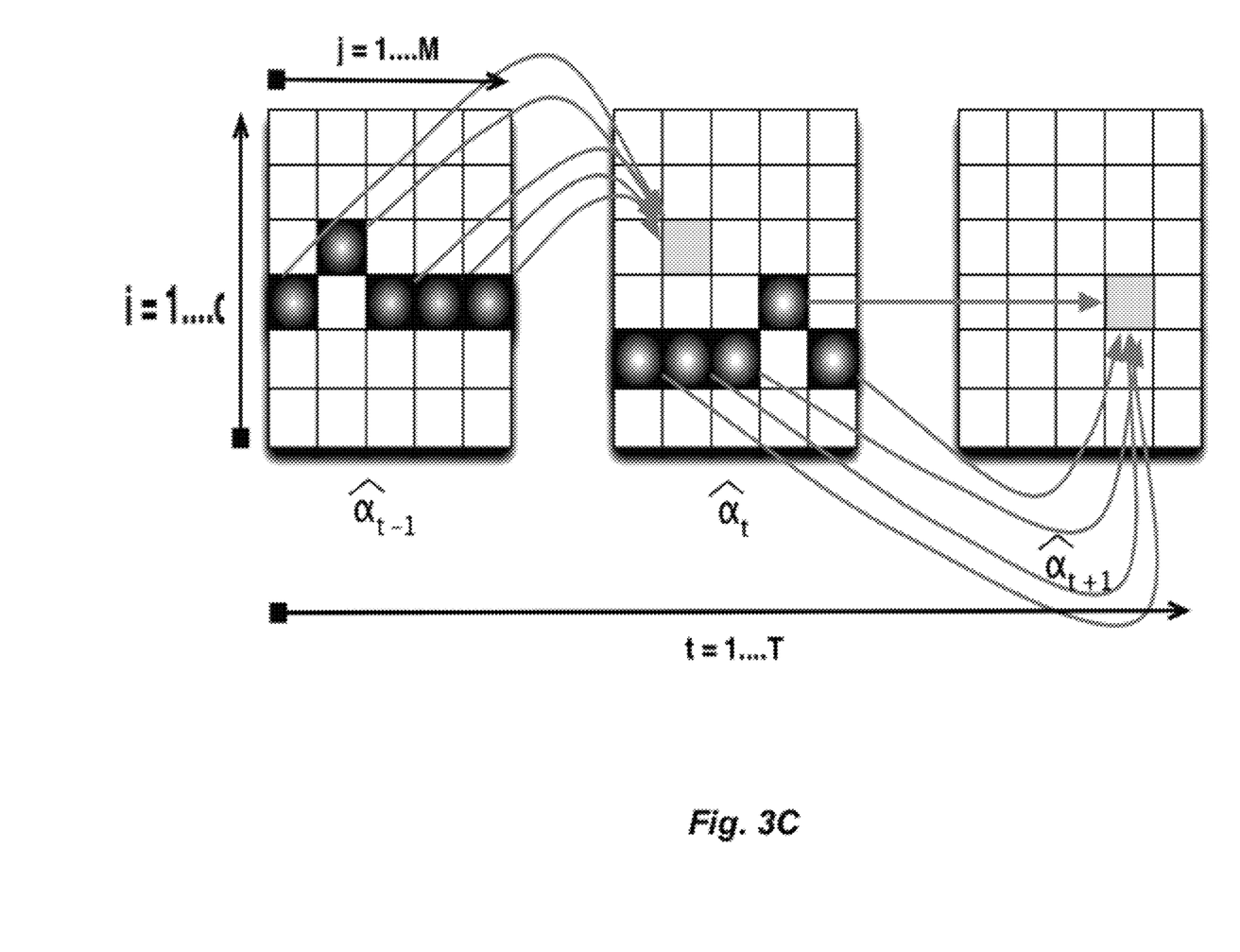

FIG. 3C shows the recursion for which the constraints are included all the locations of the lattice from indices $t-1$ to t and from t to $t+1$.

The recursion of Equation (6) determines the probability of all compressed sequences, which are defined by the set Q as $$p(Q|x) \propto Z(Q) = \sum_j \hat{\alpha}_T(c_0, j)_Q. \qquad (7)$$

Using constraint set notation $Q_{\mathbb{S}_{c_0}}$, the probability $p(c=c_0|x)$ is $$p(c = c_0 | x) \propto \sum_{\forall s: |s|=c_0} \sum_{\forall y: \mathscr{S}(y)=s} \prod_{t=1}^T \Psi(y_t, y_{t-1}, x_t) = \qquad (8)$$

$$Z(Q_{\mathbb{S}_{c_0}}) = \sum_j \hat{\alpha}_T(c_0, j)_{Q_{\mathbb{S}_{c_0}}}.$$

This corresponds to applying the recursion in Equation (6) with the constraint set s, and summing the entries at row $c_0$. As described above, $p(c=c_0|x)=0$ when $c_0>T$ or $c_0<1$. If we do this procedure for the constraint set $Q_{\mathbb{S}_T}$, the row sums of the table $\hat{\alpha}_T(i, j)_{Q_{\mathbb{S}_T}}$ produces all the lattice factors $Z(Q_{\mathbb{S}_i})$ concurrently. The summation of this table is equal to the normalizing factor Z, which is necessary for determining $p(s=s_0|x)=Z(s_0)/Z$ and $p(c=c_0|x)=Z(\mathbb{S}\quad)/Z$. This identity follows from the fact that Z is equal to the summation of the lattice factors for all possible lengths and combinations of s.

Determining $p(s_i=j|x, c)$

To determine the marginal distribution $p(s_i=j|x, c)$, we construct the constraint set $Q_{i,j}$ by including all the entries of the table with height c except the entries at row i. Then, we add $(i, j)$ to this set. This particular constraint set configuration includes all the possible compressed sequence configurations with length c and $s_i=j$. Then, the marginal probability is $p(s_i=j|x, c)=Z(Q_{ij})/\Sigma_j Z(Q_{ij})$.

Compressed Sequence

The compressed state sequence is then determined by an application of the above steps and maximizing the following:

Estimate c by $\hat{c}=\arg\max_{c_0} p(c=c_0|x)$; and

Estimate $s_i$ by $\hat{s}_i=\arg\max_j p(s_i=j|x, \hat{c})$.

Method for Generating a State Sequence from Data

Following the above, FIG. 2B shows the method 202 in greater detail.

First, we determine 251 probabilities of lengths c 261 of possible compressed state sequences corresponding to the input data sequence $x=\{x_1, x_2, \ldots, x_T\}$ 201 according to $p(c=c_0 | x)$.

Then, we estimate 252 a length $\hat{c}$ 262, of the output compressed state sequence $\hat{s}$ 203, wherein the length $\hat{c}$ has a maximum probability according to $\hat{c}=\arg\max p(c=c_0 51 x)$, wherein a $c_0$ function arg max returns the maximum probability;

Then, we determine 253 a probability of each state $s_i$ 263 in possible the compressed state sequence, having the length $\hat{c}$ according to $p(s_i=j|x, \hat{c})$, wherein $i=1, \ldots, \hat{c}$; and Finally, we estimate 254 each compressed state $\hat{s}_i$ that has a maximum probability according to $\hat{s}_i=\arg\max_j p(S_i=j|x, \hat{c})$ to estimate the output compressed state sequence $\hat{s}$, wherein the steps are performed in a processor.

Applications

We describe the following applications for our compressed state sequence inference method.

Tracking Location of a Moving Robot

In an application for a moving robot, the robot is tracked in an environment using a grid. Sequential models are frequently used for this purpose particularly to discover the environment. In this application, exact grid repetitions are not important but the compressed version, which indicates the locations traversed in order by the robot, is important.

Figure 4A:
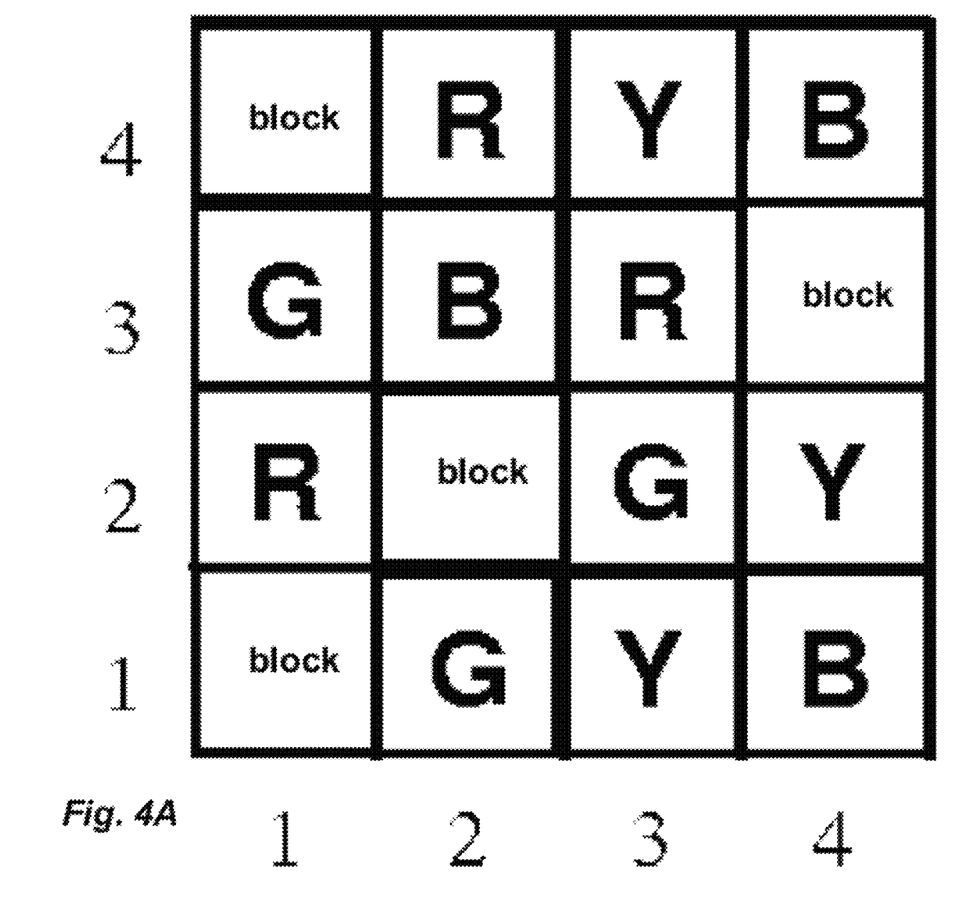
FIGS. 4A-4B are schematics of robot location tracking application according to embodiments of the invention.

As shown in FIG. 4A for an example robot application, the robot moves in an environment where the robot can sense the color of a room {blue (B), green (G), yellow (Y), red (r)} and obstacles (block), which prevent motion to that location.

At every step, the robot attempts to move {up, down, left, right}, where the robot selects the direction randomly. If there is an obstacle block in the intended direction, the robot tries again.

Figure 4B:
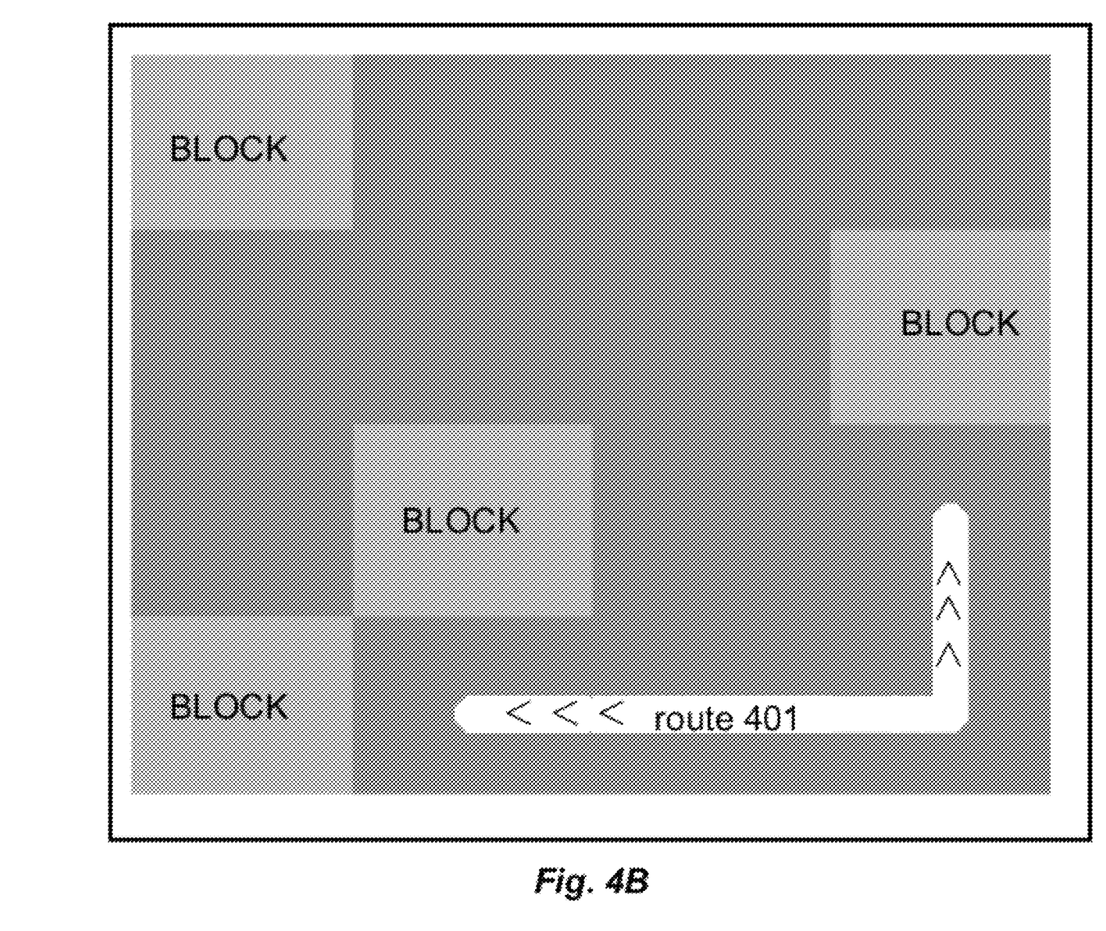

FIG. 4B shows an example path 401 for the robot. In this problem, the state refers to the location of the robot in (x, y) coordinates, and an observation refers to an observed color, which is an output of a sensor, e.g., a camera.

Figure 4C:
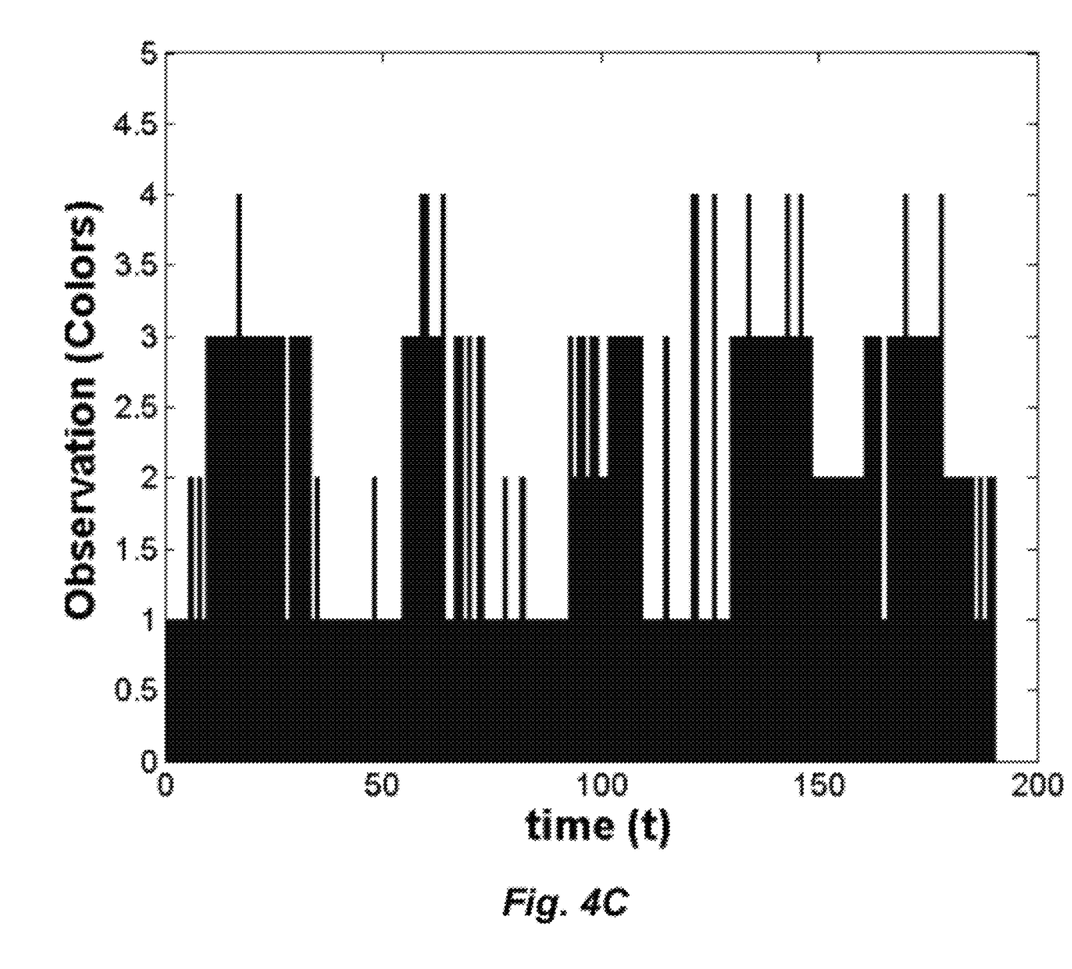
FIG. 4C is a graph of the motion as a function of time.

FIG. 4C shows the motion, in terms of observed colors, for the path 401 in FIG. 4B, as a function of time. Unfortunately, the color detection accuracy rate can be imperfect, e.g., on average 80%. In this case, although the robot is at a different location, the sensor output is incorrect, as shown by noise 402 in FIG. 4C. However, for a sequence of camera observations, the compressed state sequence inference method predicts the correct locations that the robot traverses in order.

Single Stroke Character Recognition

This application can be used with electronic devices that allow for the input of characters and glyphs using a touch screen, such as smart phones, personal digital assistance (PDAs) and tablet PCs. In general, the problem is to recognize the shape drawn on the touch screen, typically with one continuous stroke.

In this application, state refers to directions {up, right, down, left} and observation refers to quantized angles between successive input points. In general, current systems use stochastic finite state machines or HMMs for this purpose. Usually, the HMM or finite state machine is trained for a single character. Then, one class is selected by a data likelihood test using the models. One drawback of this method is its limited capability of handling arbitrary shapes. One can train a single model for all characters and decode the states by using the model. Nevertheless, a single state error can make the entire prediction erroneous. Hence, we provide a state sequence inference method, which is resistant to noise. Moreover, the ambiguity in state transitions is also a problem, because passing from one state to another is generally ambiguous.

However, our method does not estimate the exact transitions. Instead, our method produces transition sequences, which are sufficient for this task. Given the observations, e.g., quantized angles between successive points acquired from the user interface, our compressed state sequence inference method generates all the directions in order, which is indicative of a particular character.

Handwritten Word Recognition

Recognizing handwriting is generally performed by first segmenting the handwriting, and then recognizing the segments using multi-class classifier, such as a support vector machine (SVM). Often, the grammar of the language is also used. However, it is generally assumed that segmentation is done as a preprocess.

With our method, the characters are not segmented and the lengths of the sequences are not known or required because the handwritten words can have different lengths. The input handwriting is in the form of an image. In this application, each increment corresponds to one vertical column in the image of handwriting, states refer to the corresponding segment, and observations correspond to the shape context features.

While extracting the features, we first take overlapping patches from the image by using a sliding window technique. One patch is taken for each column in the image. Next, we apply a shape context descriptor. Then, we apply K-means clustering to train a dictionary using training data. We also generate histograms for each patch in the trained dictionary, which maps each point extracted from the patches to the cluster centers in the dictionary. The CRF model is trained using histograms of shape context features as observation for each increment and the states corresponds to the character that generates that observation.

While classifying, we-perform the same mapping procedure so that we have a common space with the training set, i.e., histogram space. Given the observations, e.g., histogram of shape context features, determined through a sliding window through the text, compressed state sequence inference predicts the characters in the given word in sequence.

Toll Collection

In an electronic toll collection (ETC) application, the goal is to count the number of tires and trailers of a vehicle using a camera or a 3D sensor. Using these observations over time, the compressed state sequence inference method estimates all the states, e.g., vehicle bodies, tires, towing bars, which provides the information about the number of tires and trailers of the vehicle to determine the toll.

Speech Recognition

In speech recognition, HMMs and conventional state sequence inference methods, such as Viterbi and Forward-Backward, are often used for converting spoken words to text. The underlying states of the audio signal are the phonemes and in general the exact transition point between two states is ambiguous. However, based on the speed of the spoken words, the length of the audio signal can vary for the same word. Compressed state sequence inference decodes the spoken word into phonemes without finding the exact transition points which is sufficient information for speech recognition.

EFFECT OF THE INVENTION

Conventional state sequence inference techniques for CRFs and HMMs focus on a precise prediction, which is not required in some applications where the goal is not to keep track of the dwell times in each state, but rather to track the state transitions. The invention provides a polynomial time state sequence inference procedure explicitly designed to solve this problem.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

APPENDIX

Proof. Without loss of generality, let $s_{0,1}=1$, $s_{0,2}=2$, $s_{0,3}=3$ ... $s_{0,c}=c$ and let $t_1, t_2$ through $t_{c-1}$ are the state transition times, i.e., $t_1$ is the transition from $s_{0,1}=1$ to $s_{0,2}=2$.

$$P(s=s_0|x) = \sum_{\forall y: \mathscr{C}(y)=s_0} p(y|x) \tag{11}$$

$$\propto \sum_{\forall y: \mathscr{C}(y)=s_0} \prod_{t=1}^{T} \Psi(y_t, y_{t-1}, x_t) = \tag{12}$$

$$\sum_{0<t_1<t_2<\ldots t_{c-1}\leq T} \left(\prod_{t=1}^{t_1-1}\Psi(1,1,x_t)\right)$$

$$\Psi(2,1,x_{t_1})\left(\prod_{t=t_1+1}^{t_2-1}\Psi(2,2,x_t)\right)\Psi(3,2,x_{t_2})$$

$$\left(\prod_{t=t_2+1}^{t_3-1}\Psi(3,3,x_t)\right)\Psi(4,3,x_{t_3})\ldots \tag{13}$$

$$\Psi(c,c-1,x_{t_{c-1}})\left(\prod_{t=t_{c-1}+1}^{T}\Psi(c,c,x_t)\right) =$$

$$\Psi(c,c-1,x_T)\left\{\sum_{0<t_1<t_2<\ldots t_{c-2}\leq T-1}\left(\prod_{t=1}^{t_1-1}\Psi(1,1,x_t)\right)\Psi(2,1,x_{t_1})\right. \tag{14}$$

$$\left(\prod_{t=t_1+1}^{t_2-1}\Psi(2,2,x_t)\right)\Psi(3,2,x_{t_2})\ldots$$

$$\left. \Psi(c-1,c-2,x_{t_{c-2}})\left(\prod_{t=t_{c-2}+1}^{T-1}\Psi(c-1,c-1,x_t)\right)\right\} +$$

$$\Psi(c,c,x_T)\left\{\sum_{0<t_1<t_2<\ldots t_{c-1}\leq T-1}\left(\prod_{t=1}^{t_1-1}\Psi(1,1,x_t)\right)\Psi(2,1,x_{t_1})\right.$$

$$\left(\prod_{t=t_1+1}^{t_2-1}\Psi(2,2,x_t)\right)\Psi(3,2,x_{t_2})$$

$$\left. \ldots \Psi(c,c-1,x_{t_{c-1}})\left(\prod_{t=t_{c-1}+1}^{T-1}\Psi(c,c,x_t)\right)\right\}$$

In equation 13 we rewrite equation 12 by using distributive law. In equation 14, we devide summation into two cases by only factoring out time T: (1) First part considers the case in which there is a transition from c−1 to c at time T; (2) Second part considers no transition at time T, so transition from c−1 to c was before T and at time T the previous state c is repeated. Next, let define the foward variable for s domain as $\bar{\alpha}_T(c)$ as:

$$\bar{\alpha}_T(c) = \sum_{0<t_1<t_2<\ldots t_{c-1}\leq T}\left(\prod_{t=1}^{t_1-1}\Psi(1,1,x_t)\right) \tag{15}$$

$$\Psi(2,1,x_{t_1})\left(\prod_{t=t_1+1}^{t_2-1}\Psi(2,2,x_t)\right)\Psi(3,2,x_{t_2})$$

$$\left(\prod_{t=t_2+1}^{t_3-1}\Psi(3,3,x_t)\right)\Psi(4,3,x_{t_3})\ldots$$

$$\Psi(c,c-1,x_{t_{c-1}})\left(\prod_{t=t_{c-1}+1}^{T}\Psi(c,c,x_t)\right)$$

Then it is obvious that two summation terms in equation 14 can be written in terms of these forward variables as follows:

$$\bar{\alpha}_{T-1}(c-1) = \tag{16}$$

$$\left\{\sum_{0<t_1<t_2<\ldots t_{c-1}\leq T-1}\left(\prod_{t=1}^{t_1-1}\Psi(1,1,x_t)\right)\Psi(2,1,x_{t_2})\left(\prod_{t=t_1+1}^{t_2-1}\Psi(2,2,x_t)\right)\right.$$

$$\Psi(3,2,x_{t_2})\ldots\Psi(c-1,c-2,x_{t_{c-2}})$$

$$\left. \left(\prod_{t=t_{c-2}+1}^{T-1}\Psi(c-1,c-1,x_t)\right)\right\}$$

$$\bar{\alpha}_{T-1}(c) = \tag{17}$$

$$\left\{\sum_{0<t_1<t_2<\ldots t_{c-1}\leq T-1}\left(\prod_{t=1}^{t_1-1}\Psi(1,1,x_t)\right)\Psi(2,1,x_{t_2})\left(\prod_{t=t_1+1}^{t_2-1}\Psi(2,2,x_t)\right)\right.$$

$$\left. \Psi(3,2,x_{t_2})\ldots\Psi(c,c-1,x_{t_{c-1}})\left(\prod_{t=t_{c-1}+1}^{T-1}\Psi(c,c,x_t)\right)\right\}$$

Finally we get the recursion formula:

$$\bar{\alpha}_T(c)=\Psi(c,c-1,x_T)\bar{\alpha}_{T-1}(c-1)+\Psi(c,c,x_T)\bar{\alpha}_{T-1}(c)$$

This proof is for valid for all lengths c. In other words we can think of the signal from 1 to c−1 as our signal. Hence, at any length, the recursion at time T can be written as $$\bar{\alpha}_T(i)=\Psi(i,i-1,x_T)\bar{\alpha}_{T-1}(i-1)+\Psi(i,i,x_T)\bar{\alpha}_{T-1}(i)$$

Moreover, this can be generalized to arbitrary t=1 ... T as well by recursing back in T. Thus the final form is $$\bar{\alpha}_t(i)=\Psi(i,i-1,x_t)\bar{\alpha}_{t-1}(i-1)+\Psi(i,i,x_t)\bar{\alpha}_{t-1}(i)$$

We claim:

1. A method for determining an output compressed state sequence ŝ from an input data sequence x, where a probability of a compressed state sequence $s_0$ is given by a marginalization over all segmentations y of the input data sequence according to $$p(s=s_0|x) = \sum_{\forall y: \mathscr{C}(y)=s_0} p(y|x),$$

where the symbol $\mathscr{C}$ represents a compress function, comprising the steps of:

determining probabilities of lengths c of possible compressed state sequences corresponding to the input data sequence $x=\{x_1, x_2, \ldots, x_T\}$ according to $p(c=c_0|x)$;

estimating a length $\hat{c}$, of the output compressed state sequence $\hat{s}$, wherein the length $\hat{c}$ has a maximum probability according to $\hat{c}=\arg\max p(c=c_0|x)$;

determining a probability of each state $s_i$ in a possible output compressed state sequence having the length $\hat{c}$ according to $p(s_i=j|x, \hat{c})$, wherein $i=1, \ldots, \hat{c}$; and estimating each compressed state $\hat{s}_i$ that has a maximum probability according to $\hat{s}_i = \arg\max p(s_i=j|x, \hat{c})$ to estimate the output compressed state sequence $\hat{s}$, wherein the steps are performed in a processor.

2. The method of claim 1, wherein the output compressed state sequence tracks a robot.

3. The method of claim 1, wherein the output compressed state sequence recognizes a single stroke character.

4. The method of claim 1, wherein the output compressed state sequence recognizes a handwritten word.

5. The method of claim 1, wherein the output compressed state sequence counts a number of tires and trailers of a vehicle to determine a toll.

6. The method of claim 1, wherein the output compressed state sequence recognizes speech.

7. The method of claim 1, wherein each state in the output compressed state sequence includes a label.

8. The method of claim 1, wherein the output compressed state sequence is determined using a hidden Markov model.

9. The method of claim 1, wherein the output compressed state sequence is determined using a conditional random field.

10. The method of claim 1, wherein the input data sequence is a time series.

* * * * *